G. W. WHITE.
COMBINED HARVESTER AND THRESHING ATTACHMENT.
APPLICATION FILED OCT. 17, 1916.
1,244,152.
Patented Oct. 23, 1917.
4 SHEETS—SHEET 4.
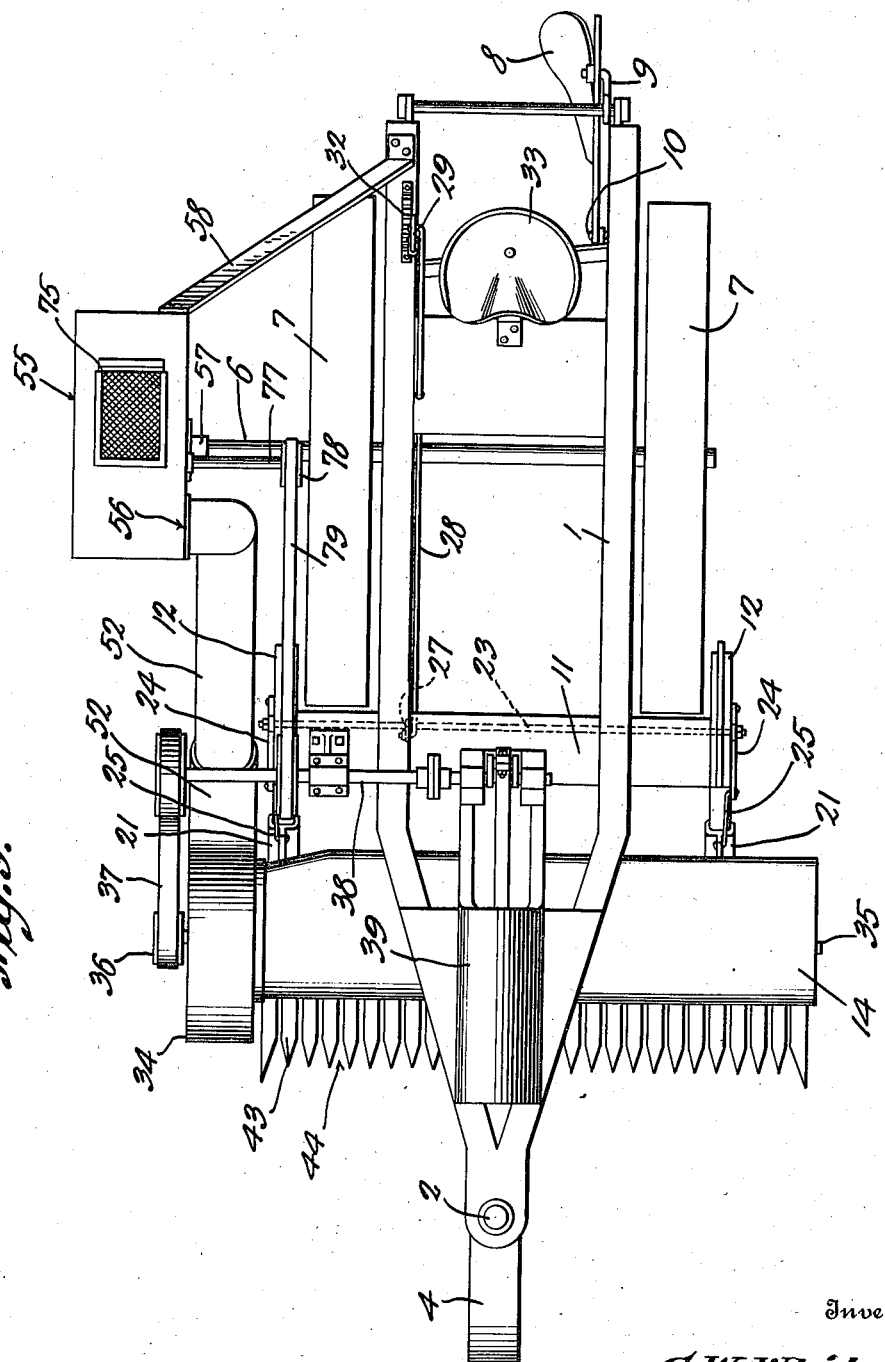

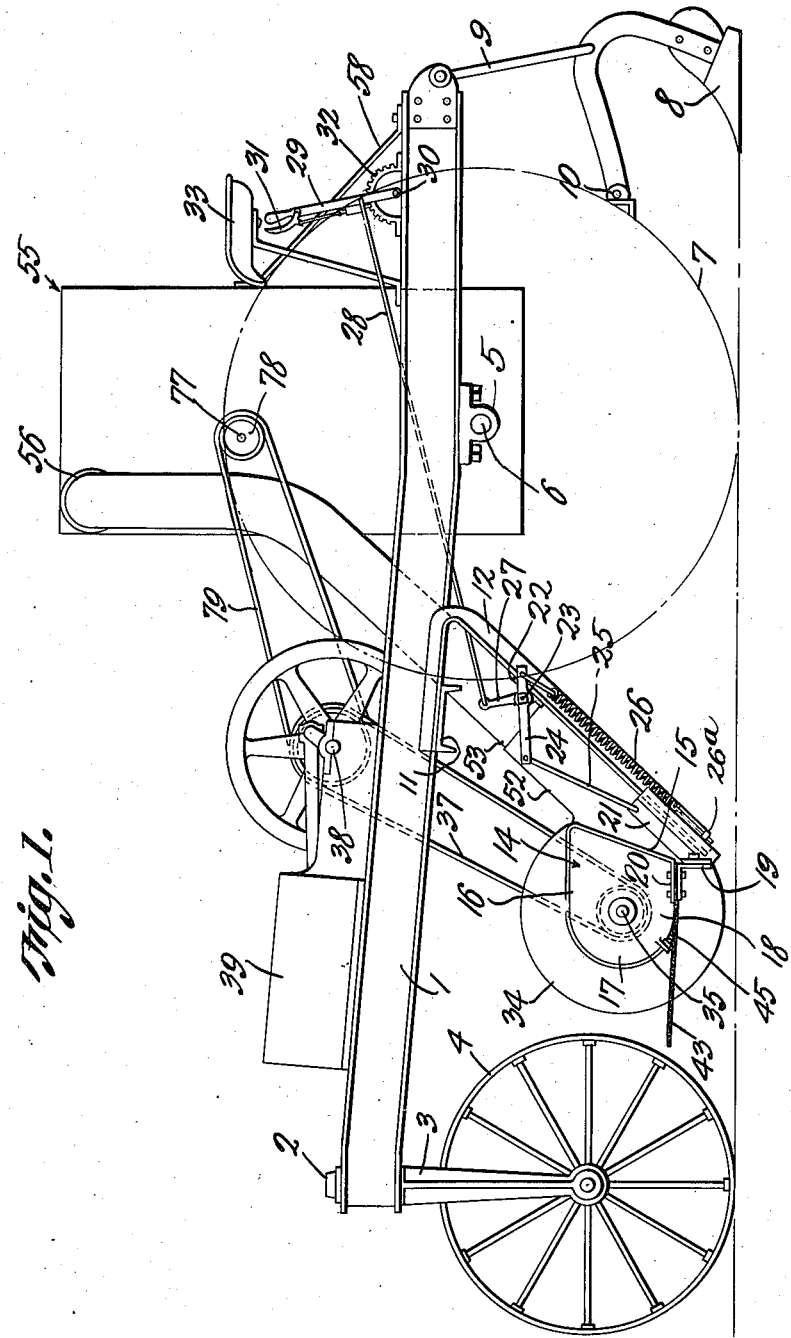

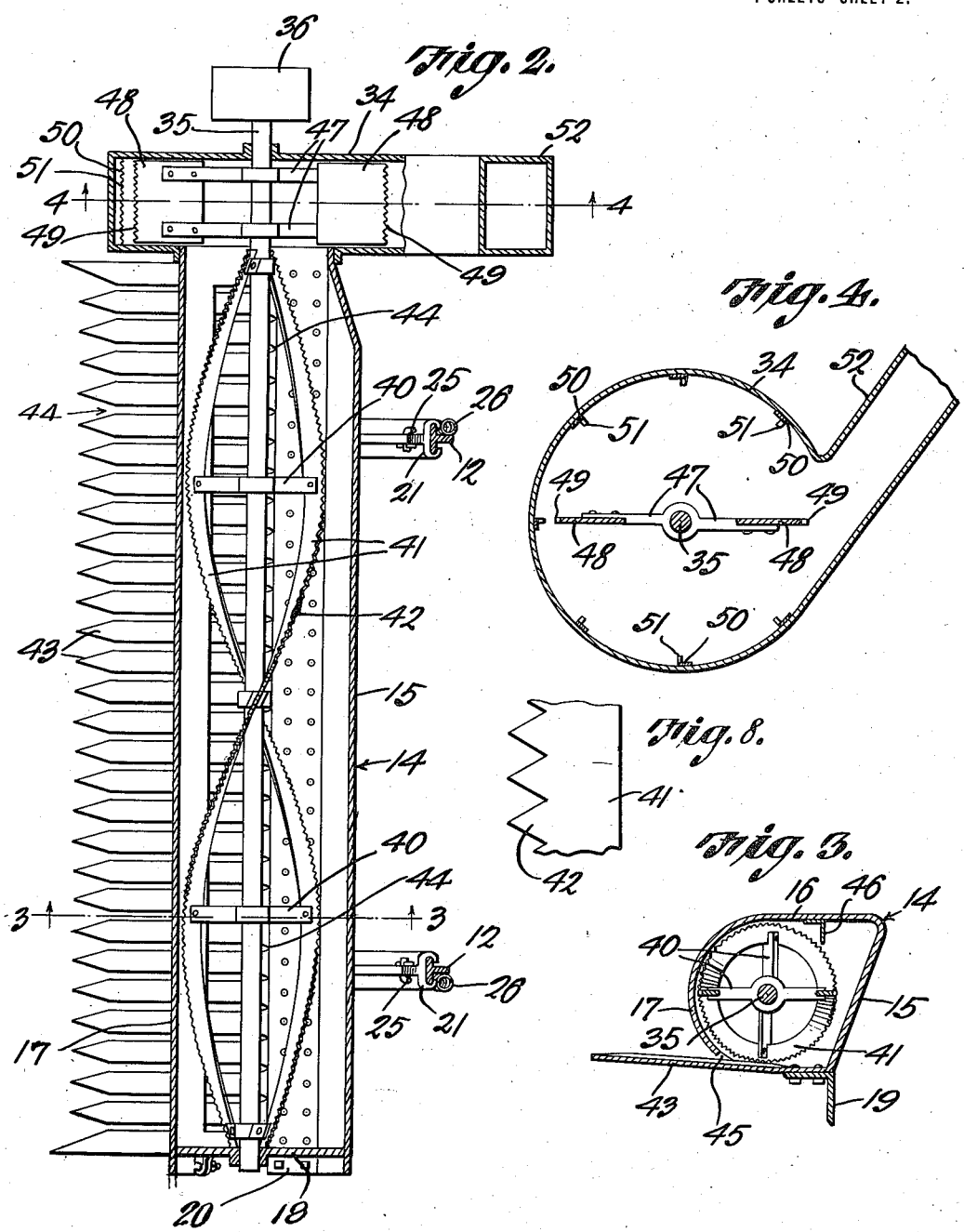

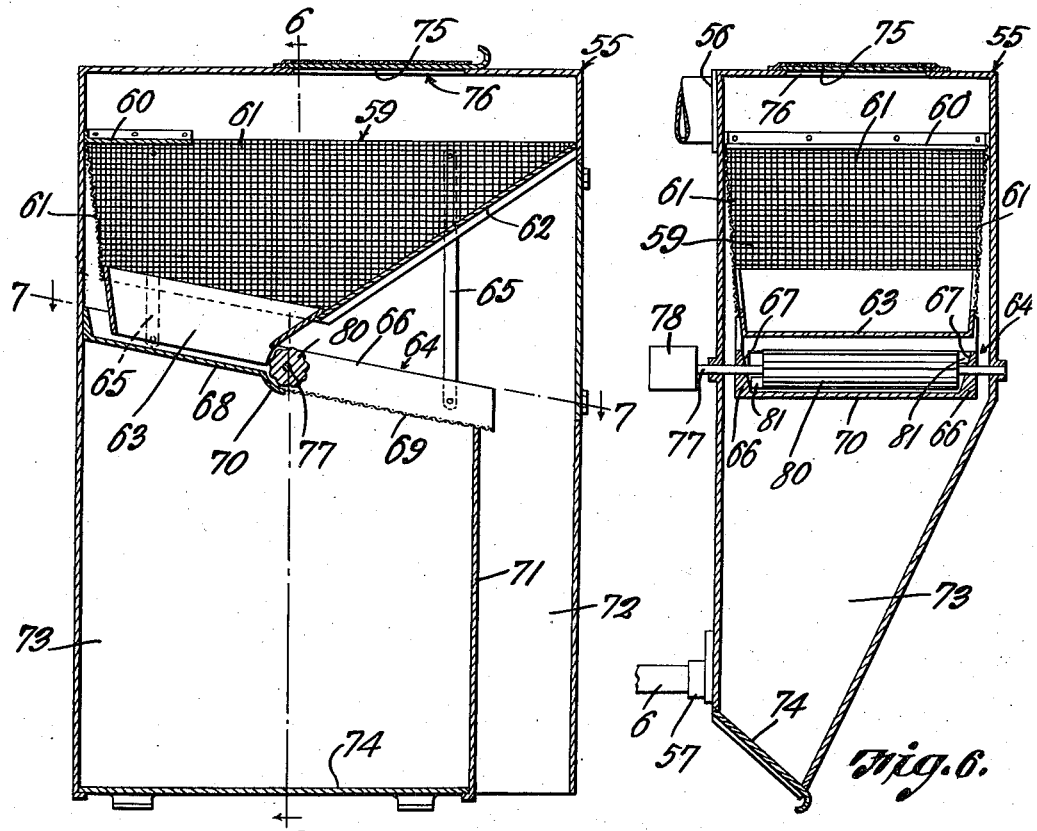
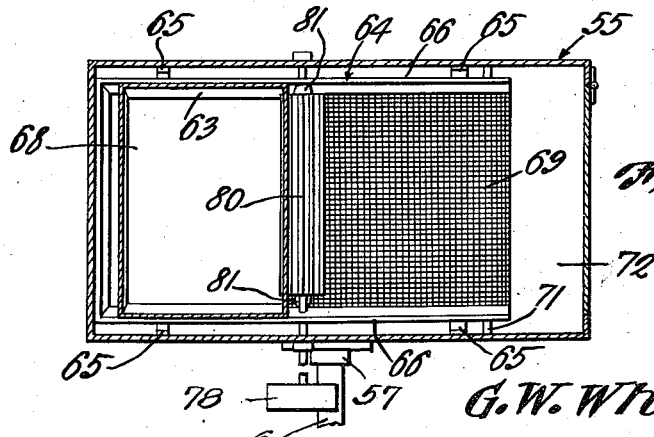

UNITED STATES PATENT OFFICE.

GEORGE W. WHITE, OF HUTCHINSON, KANSAS.

COMBINED HARVESTER AND THRESHING ATTACHMENT.

1,244,152.  Specification of Letters Patent.  Patented Oct. 23, 1917.

Application filed October 17, 1916. Serial No. 126,135.

*To all whom it may concern:*

Be it known that I, GEORGE W. WHITE, a citizen of the United States, residing at Hutchinson, in the county of Reno and State of Kansas, have invented a new and useful Combined Harvester and Threshing Attachment, of which the following is a specification.

The device forming the subject matter of this application is adapted to be employed in threshing the heads off standing grain, and for threshing the kernels out of the heads, suitable means being provided for disposing of the chaff and for collecting the kernels.

The invention aims to improve the mechanism whereby the heads are threshed off the stalks, to improve the means whereby the kernels are threshed out of the heads, and to provide novel means for conveying the material to a cleaner after it is threshed.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 is a side elevation showing a device constructed in accordance with the present invention and mounted on the frame of a motor plow.

Fig. 2 is a horizontal section showing the means whereby the grain is threshed off the standing straw;

Fig. 3 is a vertical section taken on the line 3—3 of Fig. 2;

Fig. 4 is a vertical section taken approximately on the line 4—4 of Fig. 2;

Fig. 5 is a vertical longitudinal section of the mechanism whereby the chaff is separated from the grain;

Fig. 6 is a section on the line 6—6 of Fig. 5;

Fig. 7 is a section on the line 7—7 of Fig. 5;

Fig. 8 is a fragmental elevation showing a portion of the rotary threshing member; and Fig. 9 is a top plan showing a device constructed in accordance with the invention.

In the drawings, 1 indicates the frame of a vehicle. Journaled in the forward end of the frame 1 is a vertical shaft 2 carrying a fork 3 supporting a ground wheel 4. Bearings 5 on the frame 1 support a rear axle 6 carrying ground wheels 7. Plows 8 may be movably assembled as indicated at 10 with the frame 1, the numeral 9 designating any suitable means whereby the plows may be manipulated. The frame 1 and its adjuncts as thus far set forth, have not been described in great detail, because such a frame is shown substantially in my patent on a motor plow, Number 1,168,135, granted on the 11th day of January, 1916, and, further, because the various instrumentalities to be set forth hereinafter may be mounted upon a frame differing from the one described, without jeopardizing the utility of the invention.

Secured to the frame 1 is a cross bar 11. Connected with the ends of the cross bar 11 are supports 12 which slant downwardly and forwardly, the supports being T-shaped in cross section. The numeral 14 designates a transverse hood including a downwardly and forwardly slanting rear wall 15, a horizontal top 16 merging into a curved front 17, and an end wall 18. The numeral 19 designates a base bar, the hood 14 being secured to the base bar by attaching members 20. Attached to the base bar 19 are guides 21 which slide on the supports 12 to permit a raising and lowering of the rotary threshing member hereinafter described. The supports 12 at both sides of the machine carry bearings 22 in which is mounted a rock shaft 23. Secured intermediate their ends to the ends of the shaft 23 are levers 24. A connection 25 is pivoted to the forward end of each lever 24, the lower ends of the connections being pivoted to the guides 21. The shaft 23 has an upstanding arm 27. Retractile springs 26 are secured at their upper ends to the levers 24, the lower ends of the springs 26 being secured by fastening means 26ª to the supports 12. Pivoted to the arm 27 on the shaft 23, is a rearwardly extended rod 28 pivoted to a lever 29 fulcrumed at 30 on the frame 1 and provided with a latch mechanism 31 adapted to coöperate with a segment 32 on the frame 1, the lever 29 being located adjacent a seat 33 on the frame 1.

The hood 14 carries the mechanism whereby the heads are threshed from the straw, and whereby the kernels are threshed out of the heads. The hood 14 and the mechanism carried thereby, may be raised and lowered by the lever 29, the rod 28, the arm 27 and the shaft 23. The forwardly extended portions of the levers 24 and the connections 25, cause the guides 21 to reciprocate on the supports 12 to effect a raising and a lowering of the rotary threshing member hereinafter described. The hood 14 and this threshing member ordinarily, move downwardly under their own weight when the latch 31 is released. When the threshing member descends, the springs 26 are put under tension. The springs 26 react to aid in raising the hood 14 and the threshing member.

A combined suction and blower device is provided, the same including a casing 34 mounted on one end of the hood 14, the hood 14 discharging into the casing 34. Journaled in the end wall 18 of the hood 14 and in the outer wall of the casing 34 is a shaft 35 provided with a pulley 36 about which is trained a belt 37 driven from the shaft 38 of an engine 39 mounted on the frame 1. Attached to the shaft 35 are cross arms 40 to the ends of which are secured spiral strips 41 equipped in their edges with teeth 42. Secured to the base bar 19 are forwardly presented fingers 43, the edges of which define throats 44. The fingers 43 slant downwardly and rearwardly so as to direct the material backwardly. The shaft 35 is disposed slightly in advance of the throats 44, as clearly shown in Fig. 2. The lower edge of the curved front 17 of the hood terminates a slight distance above the fingers 33 to define an opening 45 in the front of the hood 14, and substantially coextensive in length with the hood. Attached to the top 16 of the hood 14 is a depending baffle 46 substantially coextensive in length with the hood.

From the description as thus far proceeded with, it will be understood that as the machine moves forwardly, the heads of the grain are engaged between the gathering fingers 43 and pass within the contour of the hood 14 through the opening 45. The rotary threshing member including the shaft 35 and the spiral strips 41, is rotated at a high rate of speed, and the heads of the grain are pulled backwardly while they are held between the fingers 14. The teeth 42 on the spiral strips 41 engage both sides of the heads and the heads are threshed to a great extent, at this time, as the grain is severed from the straw. The detached grain is thrown rearwardly against the upwardly inclined back wall 15 of the hood 14, the grain impinging against the horizontal top 16, and ultimately striking against the baffle 46, from which the grain will be directed rearwardly against the wall 15, the grain traveling downwardly along the wall 15, to be engaged again by the spiral blades 41. The blades or strips 41 act as a conveyer and tend to advance the grain toward the blower casing 34. Owing to the fact that the grain is moved transversely of the machine, that is, longitudinally of the hood 14, and because the grain at the same time moves upwardly and downwardly on the wall 15, the grain will be threshed as it moves toward the casing 34. The loose grain and the chaff do not tend to drop between the fingers 43, because of the rapid rotation of the strips 41. The outer edges of the strips or blades 41 act like the twists of an auger, and serve to advance the grain toward and into the casing 34.

Fixed to the shaft 35 within the suction and blower casing 34 are arms 47 carrying blades 48 provided with teeth 49. Secured to the casing 34 are inwardly projecting blades 50 having teeth 51. The suction and blower casing 34 is provided with an upwardly inclined outlet 52 telescoped upon a correspondingly shaped outlet 53. The outlet 53 is fixed, in a manner which will be described hereinafter. The axis of the outlets 52 and 53 is parallel to the supports 12, so that when the rotary threshing member is raised and lowered, the members 52 and 53 may telescope, thus permitting a raising and lowering of the rotary threshing member.

The chaff and the grain, having been delivered into the casing 34 from the hood 14 by the action of the spiral strips 41, is engaged by the blades 48 which rotate with the shaft 35, and are carried around in the casing 34. Because the blades 48 are provided with the teeth 49, and because the blades 50 on the casing 34 are provided with the teeth 51, a thorough threshing operation will occur within the casing 34. The blades 48 which rotate with the shaft 35 create a strong upward draft through the telescoping outlet 52—53, the grain and the chaff being carried upwardly to a separating mechanism which will now be described.

The numeral 55 designates a casing located at one side of the frame 1 and entered, as shown at 56, by the member 53 of the telescoping outlet 52—53. The casing 55 carries a support 57 which, coacting with the axle 6, serves to uphold the casing. The casing is sustained by one or more braces 58 connected with the frame 1. Located within the casing 55 and attached thereto is a hopper 59. A table 60 is located above one end of the hopper and is attached to the casing 55. The hopper 59 includes three foraminous sides 61, an imperforated side 62, and a tubular extension 63 which may be made of canvas.

Disposed below the hopper 59 is a shaker 64 mounted to move sidewise and suspended by means of hangers 65 connected with the casing 55. The shaker 64 includes side walls 66 which are inclined as shown at 67, upon their inner faces. That part of the bottom of the shaker 64 onto which the tubular extension 63 of the hopper 59 discharges is imperforate, as shown at 68. The shaker 64 includes a bottom portion 69 which is foraminous. A concave 70 connects the portions 68 and 69 of the bottom of the shaker. Extended downwardly below the shaker 64 and constituting a part of the casing 55 is a vertical partition 71 dividing the interior of the casing 55 at its lower end into a chaff chute 72 and a grain bin 73. The grain bin 73 is provided with one or more slides 74, so that the grain may be let out at any convenient place. A slide 75 is mounted on the top of the casing 55 and controls an opening 76.

Journaled in the walls of the casing 55 is a shaft 77 carrying a pulley 78 connected by a belt 79 with the shaft 38 of the engine 39. The shaft 77 passes through the side walls 66 of the shaker 64, but the shaker 64 is mounted to move longitudinally of the shaft. Attached to the shaft 77 and located within the contour of the shaker 54 is a corrugated roller 80 coöperating with the concave 70. On the ends of the roller 80 are cams 81 coacting with the slanting surfaces 67 of the side walls 66 of the shaker 64.

The grain and chaff, having traversed the outlet 52—53, enter the casing 55 at 56 and are forced by the draft through the outlet, onto and across the table 60, the grain and the chaff passing into the hopper 59. The grain and the chaff are then deposited on the imperforate portion 68 of the bottom of the shaker 64. The air passes laterally and downwardly through the foraminous sides 61 of the hopper 59, into the grain bin 73. Thence, the air is forced upwardly through the bottom portion 69 of the shaker, and moves downwardly through the chaff chute 72.

When the shaft 77 is rotated, the roller 80 is rotated also, and the cams 81 of the ends of the roller, coacting with the slanting sides 67 of the shaker, cause the shaker to reciprocate crosswise, the hangers 65 permitting such an operation. The combined grain and chaff is pulled by the roller 80 from the imperforate portion 68 of the bottom of the shaker onto the foraminous portion 69 of the bottom of the shaker, the grain and chaff being spread out by the action of the roller. This roller, further, prevents the grain and chaff from being blown by the blast of air, onto the foraminous part 69 of the bottom of the shaker. When the products have been delivered onto the foraminous parts 69 of the bottom of the shaker, and when the shaker is reciprocated crosswise, as hereinbefore described, the grain passes through the foraminous part 69 of the bottom of the shaker and falls into the grain bin 73, from which it may be removed at any time, by opening the slide 74. As hereinbefore set forth, there is an up draft through the foraminous part 69 of the bottom of the shaker, and a down draft through the chaff chute 72. Consequently, the chaff will be separated from the grain, the chaff passing downwardly with the draft, through the chaff chute 72. If at any time there should be too much pressure within the casing 55, the slide 75 may be opened to any desired extent.

The operation of the structure has been dealt with hereinbefore, step by step, as the description has progressed, but, generally and briefly considered, is as follows:—

The grain is threshed within the hood 14, by the action of the rotary spiral feeding and threshing element 35—41. By this same element, the material is caused to move longitudinally of the hood 14 and is deposited within the casing 34. Here the material is threshed further and finally, by the coöperation between the blades 50 and 48. The blades 48 create an up draft through the outlet 52—53, the chaff and the grain being deposited in the hopper 59 and passing from the hopper into the shaker 64. The grain drops through the foraminous bottom 69 of the shaker into the grain bin 73, and the chaff is carried over into the chaff chute 72.

Especial attention is directed to the fact that the rotary threshing member which is carried by the hood 14, is raised and lowered.

The heads of the standing grain are combed between the fingers 43 until the straw is pulled down, and until the heads of grain slip into the hood. There, the heads are threshed to pieces by the rotary member comprising the strips 41. The action at this point is, therefore, a threshing action and not a stripping action. The elements 43 and 41 are threshing instrumentalities. Because the heads are threshed off instead of being stripped off, this machine may be operated with about one-half the power necessary to drive a stripper having a corresponding capacity. The reel or rotary threshing member, including the strips 41, is set farther forward than is a stripper reel, so that it may thresh the wheat before the kernels of the wheat are stripped off the stalks by being drawn between the fingers 43. In this connection it should be observed that the axis of the shaft 35 is set slightly in front of the throats 44 defined by the teeth 42, and the grain being threshed instead of being stripped off, is not pulled up.

Especial attention is directed to the V-shaped teeth on the parts 41 of the rotary threshing element. These teeth scrape the head on both sides, which cannot be accomplished by an ordinary cylinder tooth, which greatly increases its threshing facilities.

Noting Fig. 3, especial emphasis is laid on the fact that the grain is thrown upward along the part 15 of the hood 14 and then slides downward to the thresher comprising the parts 41, and is again struck many times as the material moves longitudinally of the hood 14.

Having thus described the invention, what is claimed is:—

1. In a device of the class described, a vehicle; a hood supported by the vehicle and including a downwardly and forwardly inclined rear wall, and a top; a depending baffle carried by the top; forwardly projecting fingers carried by the hood; and a spiral member journaled in the hood and operating above the fingers.

2. In a device of the class described, a vehicle having supports; a hood having guides engaging the supports slidably whereby the hood may be raised and lowered; means under the control of an operator for raising and lowering the hood; spring means for cushioning the downward movement of the hood; forwardly projecting fingers carried by the hood; and a spiral member journaled in the hood and operating above the fingers.

3. In a device of the class described, a vehicle; a support carried by the vehicle; a hood; a guide on the hood and slidably mounted on the support; forwardly presented fingers carried by the hood; a spiral member journaled in the hood and operating above the fingers; a lever fulcrumed intermediate its ends on the support; means for connecting one end of the lever with the hood; a spring; means for connecting one end of the spring with the other end of the lever; means for connecting the other end of the spring with the support; and means under the control of an operator and connected with the lever for swinging the lever to effect a raising and a lowering of the hood.

4. In a device of the class described, a vehicle; supports carried by the vehicle; a hood; guides carried by the hood and engaging the supports slidably, to permit a raising and a lowering of the hood; forwardly projecting fingers carried by the hood; a spiral member journaled in the hood and operating above the fingers; a shaft mounted to rock on the supports; levers secured intermediate their ends to the shaft, one of the levers having an upstanding arm; connections uniting each of the levers at one end with the hood; a spring uniting the other end of each of the levers with one support; a second lever mounted to swing on the vehicle; a connection between said other lever and the arm; and means for holding the second lever in adjusted positions.

5. In a device of the class described, a vehicle; a hood supported by the vehicle, the hood including a substantially horizontal top, and a forwardly and downwardly inclined rear wall connected with the rear edge of the top; fingers carried by the hood and projecting forwardly from the lower edge of the rear wall; and a spiral member journaled in the hood and operating above the fingers, the spiral member constituting means for throwing the material upwardly onto the wall, and the wall constituting means for returning the material to the spiral member, the top constituting an abutment for the material when the latter is thrown upwardly on the wall by the action of the spiral member.

6. In a device of the class described, a vehicle; a hood carried thereby; forwardly presented fingers carried by the hood; a casing into which the hood discharges at one end; a shaft journaled in the casing and in the hood; a spiral member secured to the shaft and operating in the hood above the fingers, the spiral member constituting means for advancing the material longitudinally of the hood into the casing; and outstanding threshing members carried by the shaft and operating within the contour of the casing.

7. In a device of the class described, a vehicle; a hood carried thereby; forwardly presented fingers carried by the hood; a casing into which the hood discharges at one end; a shaft journaled in the casing and in the hood; a spiral member secured to the shaft and operating in the hood above the fingers, the spiral member constituting means for advancing the material longitudinally of the hood into the casing; and outstanding blades carried by the shaft within the casing, the blades constituting threshing elements and constituting fan elements adapted to advance the material out of the casing, the casing having an outlet through which the material moves under the actuation of the said fan elements.

8. In a device of the class described, a vehicle; a hood carried thereby; forwardly presented fingers mounted on the hood; a casing into which the hood discharges at one end; a shaft journaled in the casing and in the hood; a spiral member secured to the shaft and operating in the hood above the fingers, the spiral member constituting means for advancing material longitudinally of the hood and into the casing; outstanding blades carried by the shaft and located within the casing, the blades having teeth; blades carried by the interior of the casing, the blades on the casing coöperating with the blades on the shaft to form threshing elements, the casing having an outlet, and the blades on the shaft forming fan elements adapted to advance the material from the casing through the outlet.

9. In a device of the class described, a vehicle; a hood supported on the vehicle, the hood including a substantially horizontal top and a forwardly and downwardly inclined rear wall connected with the rear edge of the top; fingers carried by the hood and projecting forwardly from the lower edge of the rear wall; a spiral member journaled in the hood and operating above the fingers, the spiral member constituting means for throwing the material upwardly onto the wall, and the wall constituting means for returning material to the spiral member, the top constituting an abutment for the material when the latter is thrown upwardly on the wall by the action of the spiral member; and a depending baffle carried by the top above the spiral member and in advance of the rear wall.

In testimony that I claim the foregoing as my own, I have hereto affixed my signature in the presence of two witnesses.

GEORGE W. WHITE.

Witnesses:
J. B. ROBERTSON,
T. C. STARK.